(12) United States Patent
Bao et al.

(10) Patent No.: US 9,502,036 B2
(45) Date of Patent: *Nov. 22, 2016

(54) CORRECTING TEXT WITH VOICE PROCESSING

(71) Applicant: International Business Machines Corporation, Armonk, NY (US)

(72) Inventors: Sheng Hua Bao, Beijing (CN); Jian Chen, Beijing (CN); Wen Liu, Beijing (CN); Yong Qin, Beijing (CN); Qin Shi, Beijing (CN); Zhong Su, Beijing (CN); Shi Lei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 14/156,976

(22) Filed: Jan. 16, 2014

(65) Prior Publication Data

US 2014/0136198 A1 May 15, 2014

Related U.S. Application Data

(63) Continuation of application No. 14/027,664, filed on Sep. 16, 2013.

(30) Foreign Application Priority Data

Sep. 29, 2012 (CN) .......................... 2012 1 0375808

(51) Int. Cl.
*G10L 15/22* (2006.01)
*G10L 15/26* (2006.01)
(Continued)

(52) U.S. Cl.
CPC .............. *G10L 15/26* (2013.01); *G06F 17/24* (2013.01); *G06F 17/273* (2013.01); *G06F 17/2863* (2013.01); *G10L 15/265* (2013.01); *G10L 15/22* (2013.01); *G10L 2015/025* (2013.01)

(58) Field of Classification Search
CPC ..... G10L 15/26; G10L 15/265; G10L 15/22; G10L 2015/025; G10L 13/08; G10L 13/04; G10L 13/07; G10L 13/02; G06F 17/2863; G06F 17/273; G06F 17/24; H05K 999/99
See application file for complete search history.

(56) References Cited

U.S. PATENT DOCUMENTS 6,064,959 A    5/2000 Young et al.
6,615,172 B1   9/2003 Bennett et al.
(Continued)

FOREIGN PATENT DOCUMENTS

CN    1555553 A    12/2004
CN    1708784 A    12/2005
(Continued)

OTHER PUBLICATIONS

PCT International Search Report and Written Opinion; International Application No. PCT/CN2013/080858; International Filing Date: Aug. 6, 2013; Date of Mailing: Nov. 14, 2013; pp. 1-10.
(Continued)

*Primary Examiner* — Fariba Sirjani
(74) *Attorney, Agent, or Firm* — Cantor Colburn LLP; Keivan Razavi

(57) ABSTRACT

The present invention relates to voice processing and provides a method and system for correcting a text. The method comprising: determining a target text unit to be corrected in a text; receiving a reference voice segment input by the user for the target text unit; determining a reference text unit whose pronunciation is similar to a word in the target text unit based on the reference voice segment; and correcting the word in the target text unit in the text by the reference text unit. The present invention enables the user to easily correct errors in the text vocally.

9 Claims, 5 Drawing Sheets

(51) Int. Cl.
*G06F 17/24* (2006.01)
*G06F 17/27* (2006.01)
*G06F 17/28* (2006.01)
*G10L 15/02* (2006.01)

(56) References Cited

U.S. PATENT DOCUMENTS

| | | | |
|---|---|---|---|
| 6,725,194 B1 | 4/2004 | Bartosik et al. | |
| 7,461,001 B2* | 12/2008 | Liqin | G10L 13/00 704/235 |
| 7,848,926 B2 | 12/2010 | Goto et al. | |
| 7,941,316 B2 | 5/2011 | Mahajan et al. | |
| 7,949,524 B2 | 5/2011 | Saitoh et al. | |
| 7,974,844 B2* | 7/2011 | Sumita | G10L 15/1815 704/237 |
| 8,473,295 B2 | 6/2013 | Mowatt et al. | |
| 8,478,590 B2 | 7/2013 | Lebeau et al. | |
| 8,527,272 B2* | 9/2013 | Qin | G06F 17/2827 704/254 |
| 8,954,333 B2 | 2/2015 | Chino et al. | |
| 9,123,339 B1* | 9/2015 | Shaw | G10L 15/22 |
| 2002/0138265 A1* | 9/2002 | Stevens | G10L 15/22 704/251 |
| 2004/0249637 A1* | 12/2004 | Baker | G10L 15/1822 704/239 |
| 2005/0049868 A1 | 3/2005 | Busayapongchai | |
| 2005/0203751 A1 | 9/2005 | Stevens et al. | |
| 2006/0100871 A1 | 5/2006 | Choi et al. | |
| 2006/0161434 A1* | 7/2006 | Faisman | G10L 15/22 704/246 |
| 2006/0190255 A1* | 8/2006 | Fukada | G10L 15/22 704/251 |
| 2006/0293889 A1* | 12/2006 | Kiss | G10L 15/22 704/235 |
| 2007/0100602 A1* | 5/2007 | Kim | G06F 17/2735 704/8 |
| 2007/0208567 A1* | 9/2007 | Amento | G10L 15/22 704/270 |
| 2007/0288240 A1* | 12/2007 | Huang | G10L 13/033 704/260 |
| 2008/0270110 A1* | 10/2008 | Yurick | G06F 17/30026 704/3 |
| 2009/0043568 A1 | 2/2009 | Kagoshima | |
| 2009/0125299 A1* | 5/2009 | Wang | G10L 15/22 704/201 |
| 2009/0132231 A1* | 5/2009 | O'Dell | G06F 3/018 704/2 |
| 2010/0003659 A1* | 1/2010 | Edmonds | G09B 5/062 434/350 |
| 2010/0063798 A1* | 3/2010 | Ku | G06F 17/2863 704/9 |
| 2010/0145694 A1 | 6/2010 | Ju et al. | |
| 2011/0145224 A1 | 6/2011 | Bangalore | |
| 2013/0090916 A1* | 4/2013 | Wang | G06F 17/273 704/9 |
| 2014/0095160 A1 | 4/2014 | Bao et al. | |

FOREIGN PATENT DOCUMENTS

| | | |
|---|---|---|
| CN | 101031913 A | 9/2007 |
| CN | 101326533 A | 12/2008 |
| CN | 101605171 A | 12/2009 |

OTHER PUBLICATIONS

Y. Bassil, et al.,"Post-Editing Error Correction Algorithm for Speech Recognition using Bing Spelling Suggestion," (IJACSA) International Journal of Advanced Computer Science and Applications, vol. 3, No. 2, 2012, pp. 95-101.

M. Jeong, et al., "Semantic-Oriented Error Correction for Spoken Query Processing," Automatic Speech Recognition and Understanding, ASRU '03, IEEE Workshop, 2003, pp. 1-6.

J. Schalkwyk, et al., "Google Search by Voice: A case study," Advances in Speech Recognition: Mobile Environments, Call Centers and Clinics, Springer (2010), pp. 1-35.

K. Sinha, et al., "Enabling Accent Resilient Speech Based Information Retrieval," WWW 2012 Companion,—Poster Presentation, Apr. 16-20 2012, Lyon France, pp. 601-602.

K. Vertanen, et al., "Intelligently Aiding Human-Guided Correction of Speech Recognition," Proceedings of the Twenty-Fourth AAAI Conference on Artificial Intelligence, 2010, pp. 1698-1701.

* cited by examiner

CORRECTING TEXT WITH VOICE PROCESSING

PRIORITY

This application is a continuation of U.S. patent application Ser. No. 14/027,664, filed Sep. 16, 2013, which claims priority to Chinese Patent Application No. 201210375808.9, filed Sep. 29, 2012, and all the benefits accruing therefrom under 35 U.S.C. §119, the contents of which in its entirety are herein incorporated by reference.

BACKGROUND

The present invention relates to voice processing, and more specifically, to a method and system for correcting text with voice processing.

At present, voice applications are attracting more and more attention from industry and academic with the fast development of the information technology. Voice application enables a user to search on the internet by voice, or make recording on portable devices with voice.

Although the precision of current voice recognition technology has been improved significantly, the precision of returned result is far from enough due to various factors. Therefore, the user has to correct recognition result manually. For example, if a word needs to be corrected, the user has to double click the word, and then input a correct word by a text input technology. This troublesome process would reduce user's interest in using voice software. In general, error normally occurs on words out of a vocabulary or on some terminological words. Therefore, it is desirable to provide a solution facilitating a user to correct error in a text recognized by voice.

SUMMARY

In one embodiment, a method of correcting text includes determining a target text unit to be corrected in the text; receiving a reference voice segment input by the user for the target text unit; determining a reference text unit whose pronunciation is similar to a word in the target text unit based on the reference voice segment; and correcting the word in the target text unit in the text by the reference text unit.

In another embodiment, a system for correcting text includes a target text unit determining section configured to determine a target text unit to be corrected in the text; a reference voice segment receiving section configured to receive a reference voice segment input by a user for the target text unit; a reference text unit determining section configured to determine a reference text unit whose pronunciation is similar to a word in the target text unit based on the reference voice segment; and a target text unit correcting section configured to correct the word in the target text unit in the text by the reference text unit.

BRIEF DESCRIPTION OF THE SEVERAL VIEWS OF THE DRAWINGS

Through the more detailed description of some embodiments of the present invention in the accompanying drawings, the above and other targets, features and advantages of the present invention will become more apparent, wherein the same reference generally refers to the same components in the embodiments of the present invention.

DETAILED DESCRIPTION

Figure 1:
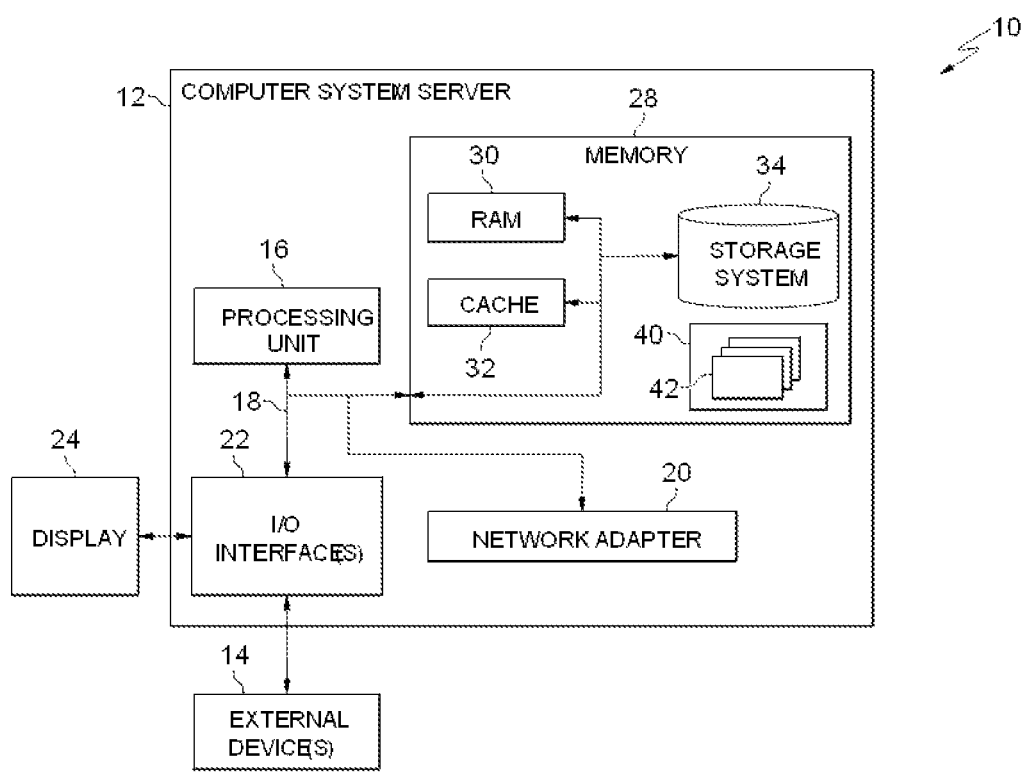
FIG. 1 illustrates a block diagram of an exemplary computer system which is applicable to realize embodiments of the present invention.

Considering that several errors occur on words with the same pronunciation but different meanings, or words with similar pronunciation, the present invention embodiments provide a method and system for correcting text based on voice processing.

According to one embodiment of the present invention, there is provided a method for correcting a text, comprising: determining a target text unit to be corrected in a text; receiving a reference voice segment input by the user for the target text unit; determining a reference text unit whose pronunciation is similar to a word in the target text unit based on the reference voice segment; and correcting the word in the target text unit in the text by using the reference text unit.

According to another embodiment of the present invention, there is provided a system for correcting a text, comprising: a section configured to determine a target text unit to be corrected in a text; a section configured to receive a reference voice segment input by a user for the target text unit; a section configured to determine a reference text unit whose pronunciation is similar to a word in the target text unit based on the reference voice segment; and a section configured to correct the word in the target text unit in the text by using the reference text unit.

The invention enables a user to easily correct errors in a text.

Some exemplary embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create section for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
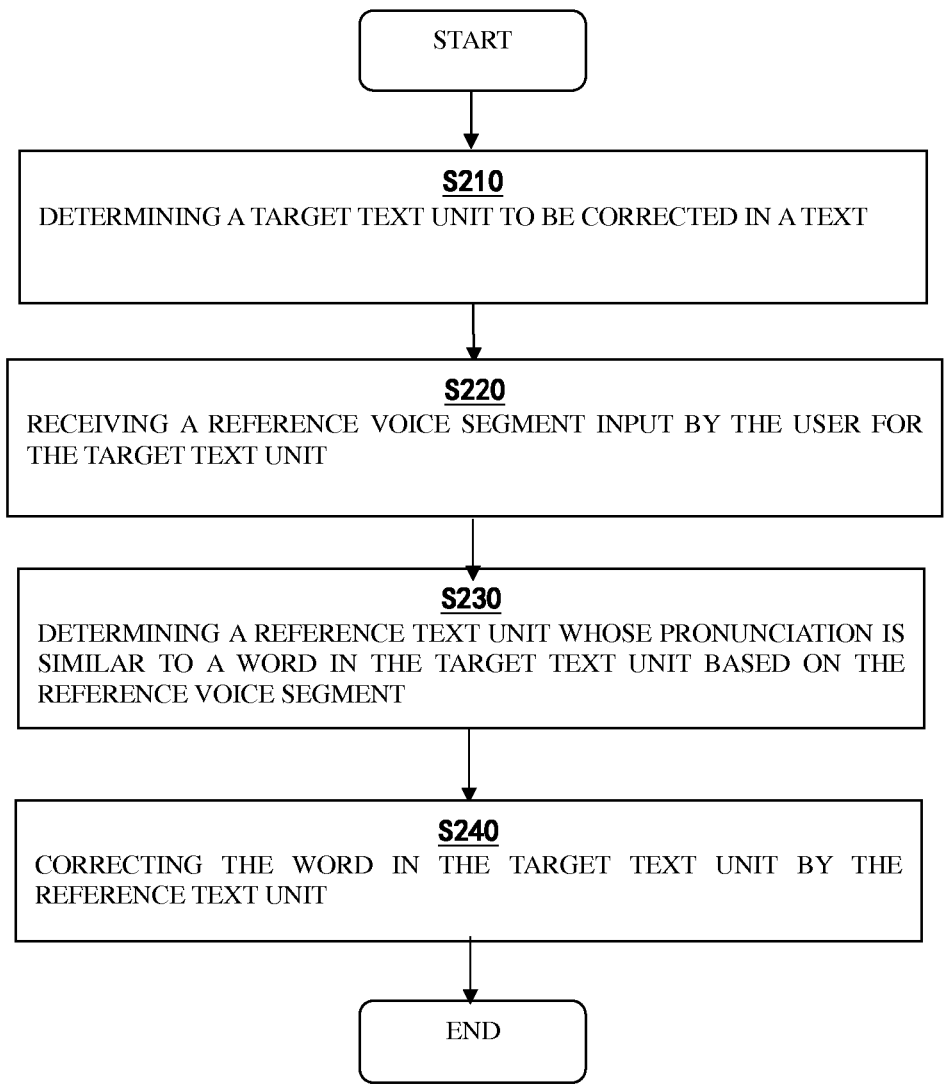
FIG. 2 illustrates a flowchart of the method for correcting text according to one embodiment of the present invention.

With reference now to FIG. 2, FIG. 2 illustrates a method for correcting text according to one embodiment of the present invention.

At block S210, a target text unit to be corrected is determined in a text. The text may be a text in any form. For example, it may be a text input directly from the user, or may be a text recognized from voice data that is input by the user. According to one embodiment of the present invention, in the case that the text is a recognized text of voice data, the recognized text of the voice data may be a text generated by any prior art recognition technology. The target text unit may comprise one or more words, and it is understood that the present invention can be applied to any language, but not limited to Chinese. Therefore, the term "word" in the present invention is not limited to a Chinese character, but meant to refer to a sub-unit in any language, such as a word in English. For example, according to one embodiment of the present invention, in case of Chinese, the target text unit may be a word or sentence to be corrected, comprising one or more Chinese characters. Alternatively, in case of English, the target text unit may be a phrase or sentence comprising one or more words.

According to one embodiment of the present invention, determining the target text unit may be implemented by receiving user's manual option. For example, the user may determine the target text unit to be corrected by using a mouse or selecting directly on a touch screen. In the case that the text is a recognized text of voice data, the recognized text is often composed of a group of recognized text units which are divided by unit boundaries. In such a case, according to one embodiment of the present invention, it is possible to obtain the confidence of each recognized text unit, and the target text unit to be corrected is determined according to the confidence value. For example, the lower the confidence value is, it indicates that the larger the possibility that the text unit involves recognition error is. Therefore, it is possible to select the text unit with the lowest confidence to be corrected first. In some cases, the text does not contain unit boundaries for text units. At this point, determining the target text unit may further comprise recognizing the unit boundaries for the text units of the text.

At block S220, a reference voice segment input by the user for the target text unit is received. After determining the target text unit to be corrected, the user may pronounce a voice segment for the target text unit to be corrected. The voice segment may be a sentence or a phrase, wherein the reference voice segment comprises text content which is considered by the user to be correct for the target text unit. In general, the user may select a phrase which has high precision and is immune to errors in voice recognition, such as some frequently used phrases, or phrases or sentences with specific context, etc.

At block S230, a reference text unit whose pronunciation is similar to the words in the target text unit is determined according to the reference voice segment.

According to one embodiment of the present invention, for the reference voice segment input by the user, voice recognition is performed first to obtain a reference text segment, which is then used to determine the reference text unit whose pronunciation is similar to the words in the target text unit. Moreover, according to one embodiment of the present invention, the pronunciation similarity of a word may be calculated based on the similarity of the phoneme corresponding to the word. It is understood that pronunciation being similar also comprises the case of pronunciation being the same.

According to one embodiment of the present invention, when determining the reference text unit whose pronunciation is similar to the words in the target text unit from the reference text segment, it is possible to determine a correspondence of at least one word in the reference text segment and at least one word in the target text unit based on the pronunciation similarity firstly, and then determine the reference text unit corresponding to the at least one word of the target text unit based on the correspondence.

According to one embodiment of the present invention, determining the reference text unit may also determine the correspondence of the reference voice segment and the pronunciation of the target text unit by directly comparing both of them. For example, it is possible to determine a pronunciation sub-segment whose pronunciation is similar to words in the target text unit from the reference voice segment based on pronunciation similarity. At the same time, it is possible to obtain the reference text segment by voice-recognizing the reference voice segment. At this point, the reference text segment comprises the reference text unit corresponding to the voice sub-segment. Therefore, it is possible to obtain the reference text unit corresponding to the voice sub-segment from the reference text segment.

At block S240, at least one word in the target text unit in the text is corrected by using the reference text unit. Since the user may select a phrase or a complete semantic unit which has a high precision and is immune to errors in voice recognition as the reference voice segment, the text precision of the voice-recognized reference text segment is relatively high. In this case, it is possible to improve the precision and efficiency of the text correction by using the reference text unit with relatively high precision to correct the target text unit.

According to one embodiment of the present invention, in the case that multiple reference text units are available for selection, it is possible to automatically select a word with higher confidence based on the confidence of the reference text unit, or recommend one to the user, or the user may make a further selection.

According to one embodiment of the present invention, the reference text segment may comprise multiple reference text units whose pronunciation is similar to words in the target text unit. That is, in order to further improve the precision of voice recognition, the user may give multiple different hints for the same word in the target text unit. For example, for the word "音 (yin; tone)" in the target recognition unit, the user may say several words such as "音乐(yin yue; music)", "语音 (yu yin; voice)", "声音 (sheng yin; sound)" and so on at a time. In this case, it is possible to recognize two words "音 (yin)" and "英 (ying; hero)" for selection by voice recognition. At this point, it is possible to select one of the multiple reference text units to correct at least one word in the target text unit. The selection may be manually done by the user, or automatically done by the system. For example, for the multiple reference text units, it is possible to provide corresponding confidence based on the voice recognition, and take the reference text unit with the highest confidence as a final reference text unit to correct at least one word in the target text unit.

According to one embodiment of the present invention, the reference voice segment input by the user may comprise content corresponding to every word contained in the target text unit to be corrected, or may comprise content corresponding to only a part of words therein. In addition, the order or priority of the contents in the reference voice segment may be different from that of the corresponding words in the target text unit.

A method according to one embodiment of the present invention will be described in the following by taking a Chinese text as an example.

First, the user hopes to input a sentence of "星期五语音组去香木香羊聚餐，大家于上午九点在西二旗城铁集合(xing qi wu yu yin zu qu Xiang Mu Xiang Yang ju can, da jia yu shang wu jiu dian zai Xi Er Qi cheng tie ji he; the voice group will have a lunch at Xiang Mu Xiang Yang restaurant, and everybody arrives at Xi Er Qi subway station by 9 am)" by voice. The voice input by the user is recognized after it is received. However, due to the precision limitation of the voice recognition, the result by the voice recognition becomes "星期五|育英组| 去|项目象牙| 聚餐，大家|于|上午九 点|在|西二期| |城铁|集合(xing qi wu|yu ying zu|qu|Xiang Mu Xiang Ya|ju can, da jia|yu|shang wu jiu dian|zai |Xi Er Qi|cheng tie|ji he)". Several errors occur in the voice recognition result, that is, "育英组" (which should be "语音组"), "项目象牙" (which should be "香木香羊"), and "西二期" (which should be "西二旗").

In this case in which multiple errors occur, the user may select the word to be corrected manually. For example, the user may pick "育英组" as the words to be corrected by drawing a circle around it on the touch screen. It is also possible to select a word to be corrected directly by using the word boundaries provided after the voice recognition.

Then, the user says a sentence of "语言和音乐 相组合，(yu yan he yin yue xiang zu he; combing language with music)" vocally. This sentence comprises syllables "yu", "yin", and "zu" whose pronunciation is similar to the pronunciation "yuyingzu" of "育英组". Since "语言", "音乐", and "组合" all are frequently used words in the vocabulary, it is possible to precisely recognize the voice input by the user as the text of "语言和音乐 相组合". Accordingly, it is possible to determine "yu", "yin", and "zu" correspond to "语", "音", and "组" respectively according to the pronunciation similarity, and thereby to correct "育英组" as "语音组".

Similarly, for "项目象牙" whose correct text should be "香木香羊", the user says a phrase of "香味木头和带香味的羊 (xiang wei mu tou he dai xiang wei de yang; wood smelling good and goat with good smell)" after selecting the "项目象牙". Thereby, "xiang", "mu", "xiang", and "yang" are determined to correspond to the text of "香", "木", "香", and "羊" respectively according to the pronunciation similarity, and the "项目象牙" is thus corrected as "香木香羊".

Similarly, for "西二期" whose correct text should be "西二旗", the user says a phrase of "红旗飘飘 (hong qi piao piao; waving flag)" after selecting the "西二期". Thereby, the pronunciation "qi" is determined to correspond to the text of "旗" according to the pronunciation similarity, and the "西二期" is corrected as "西二旗".

According to one embodiment of the present invention, the reference voice segment input by the user may be for all the characters in the target text unit, or only for a part of it. For example, in this example, although the determined target text unit is "西二期" that comprises three characters, the reference voice segment "红旗飘飘" input by the user may be for only one character "期" therein.

According to one embodiment of the present invention, it is possible to implement the comparison of the similarity between the reference voice input by the user and the pronunciation of the target text unit by employing any suitable technology in the art. For example, it is possible to find a unit whose pronunciation is similar to the target text unit in the reference text corresponding to the reference voice based on phoneme similarity.

Figure 3:
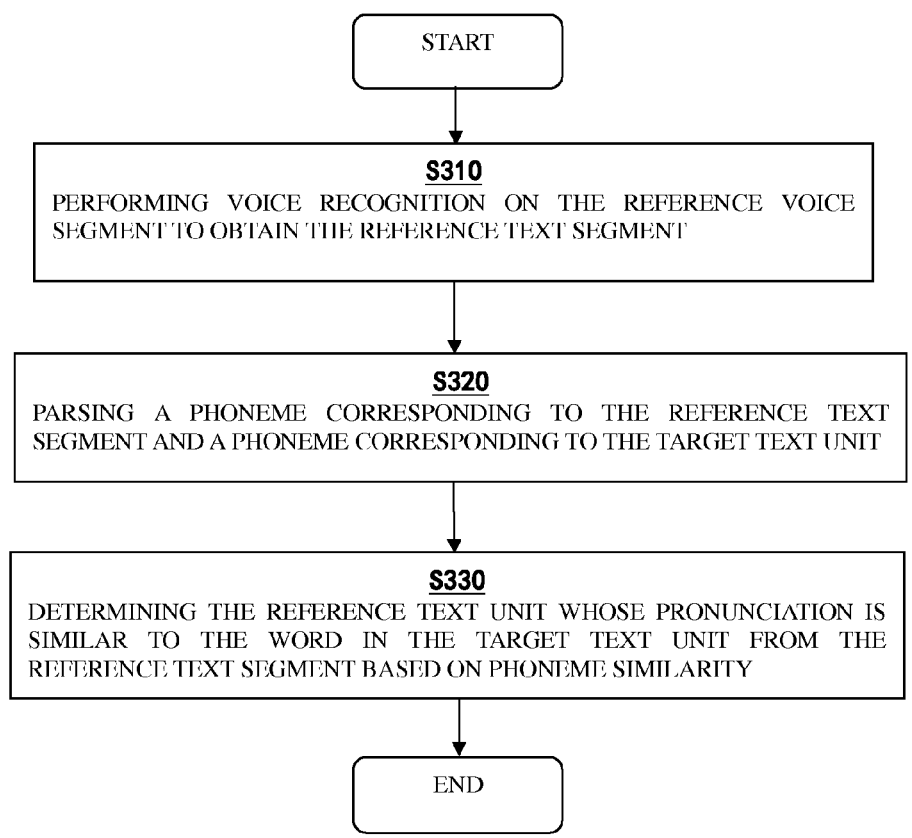
FIG. 3 illustrates a flowchart of the method for correcting text according to another embodiment of the present invention.

In the following, an embodiment of block S230 is described in detail with reference to FIG. 3 by taking the target text unit "育英组" to be corrected and the corresponding reference voice segment "吾言和音 乐相组合" as an example. FIG. 3 schematically illustrates a process of determining a reference text unit whose pronunciation is similar to the words of the target text unit to be corrected according to the reference voice segment.

At block S310, the reference voice segment is voice-recognized to obtain a reference text segment. For example, for the reference voice segment input by the user, the corresponding reference text segment "语言和音乐 相组合" is obtained.

At block S320, the phonemes corresponding to the reference text segment and the phonemes corresponding to the target text unit are parsed. During the parsing, it is possible to divide each Chinese character into initial consonant part (i.e. the first phoneme) and vowel part (i.e. the second phoneme). For a Chinese character with double vowels, it is possible to divide it into two parts by using known suitable techniques. Taking Chinese characters "音" and "英" as example, the pronunciation of the Chinese character "音" is "YIN", which can be divided into two phonemes "Y" and "IN". The pronunciation of the Chinese character "英" is "YING", which can be divided into two phonemes "Y" and "ING".

For example, the phoneme sequences for the target text unit "育英组" and the reference text segment "吾言和音乐相组合" are as follows:

```
The target text unit:
Y U Y ING Z U

The reference text segment:
Y U Y AN H E Y IN Y UE X IANG Z U H E.
```

At S330, the reference text unit whose pronunciation is similar to words in the target text unit in the reference text segment is determined based on the phoneme similarity.

It is appreciated that a phoneme is the smallest unit in the voice system of a certain language. Difference languages or dialects have different phoneme systems. For example, Chinese and English have different phoneme systems. Northeast dialect and Shanghai dialect in China have also different phoneme systems. The number of phonemes in the phoneme systems of different languages differs a lot, from more than ten up to more than a hundred, but it is a limited number. The similarity between different phonemes is different for different language.

For example, in Chinese Pinyin (pronunciation), phonemes "ING" and "IN" are similar, but "ING" and "AO" are not similar. In the method of the present invention, it is possible to find text units with similar phonemes in the reference voice segment and the target text unit based on the phoneme similarity.

Taking Chinese characters "音" and "英" as an example, The Pinyin for Chinese character "音" is "YIN", which can be divided into two phonemes "Y" and "IN". The Pinyin for Chinese character "英" is "YING", which can be divided into two phonemes "Y" and "ING". Then, the similarity of the phonemes of the two Chinese characters is compared. If the two phonemes of the two Chinese characters are similar or the same respectively, the phonemes of the two Chinese characters are considered similar; otherwise, the phonemes of the two Chinese characters are considered not similar. In this example, their first phonemes "Y" are the same. Their second phonemes "IN" and "ING" are not the same but similar. Therefore, the phonemes of the Chinese characters "音" and "英" can be considered similar. Accordingly, the parts whose pronunciation is similar in the reference voice segment and the target text unit is recognized based on the phoneme similarity.

It should be understood that the match based on phoneme similarity may employ various known algorithms such as dynamic time wrapping DTW algorithm, the smallest element matching, and dynamic programming algorithm, etc.

The phoneme similarity between different phonemes may be predetermined. For example, it is possible to measure the phoneme similarity by Euclidean distance or Bhattacharyya distance. It can be easily understood that in the case of measuring phoneme similarity by distance, the larger the phoneme model distance is, the smaller the similarity is. It is also possible to measure the phoneme similarity simply with a binary value of being similar or being not similar.

It should be understood that the measurement of the phoneme similarity may be predetermined. In the method of the present invention, it is possible to find the phoneme similarity simply by searching a predetermined phoneme similarity table or database.

Based on the phoneme similarity, for any two given Chinese characters, the pronunciation similarity between the characters is calculated based on the following method of adding the similarity (distance) of the first phonemes of the two characters to the similarity (distance) of the second phonemes, and the sum is the pronunciation similarity (distance) of the two Chinese characters. However, it is also possible to take the average similarity per phoneme after division as the similarity of the characters, that is, the sum of the phoneme similarities of the two Chinese characters is divided by the number of the phonemes "2" as the pronunciation similarity of the two Chinese characters. For simplicity, in the present embodiment, the sum of the similarities of respective phonemes is taken as the pronunciation similarity of the two characters.

For simplicity, the influence of tone on the phoneme similarity is not considered in this example. With the teaching of the illustrated embodiments, the method of the present invention can be easily expanded by those skilled in the art to consider the tone to meet requirement of high precision.

The principle of DTW algorithm is known in the prior art. With the teaching of the illustrated embodiments, those skilled in the art can easily conceive that it is also possible to use other implementation of the DTW algorithm to find the best match path between the target text and the reference text.

Herein, the phonemes "Y U" of the character "育" in the target text unit are the same as the phonemes "Y U" of the character "吾" in the reference text segment; therefore, it is determined that the character "育" in the target text unit correspond to the character "语" in the reference text segment. The phonemes "Y ING" of the character "英" in the target text unit are similar to the phonemes "Y IN" of the character "音" in the reference text segment; therefore, it is determined that the character "英" in the target text unit correspond to the character "音" in the reference text segment. The phonemes "Z U" of the character "组" in the target text unit are similar to the phonemes "Z U" of the character "组" in the reference text segment; therefore, it is determined that the character "组" in the target text unit correspond to the character "组" in the reference text segment. The reference text unit corresponding to at least one character in the target text unit is then determined according to the determined correspondence. Here, the determined reference text unit is "语音组".

A specific implementation of applying the present invention to Chinese is illustrated in the above. However, it is understood that the method of the present invention can be applied to any language. The basic method is taking a character or word as the basic unit, and then determining the correspondence between a reference text and a target text based on the pronunciation similarity between the basic units. The difference is only in that the calculation of the pronunciation similarity of the basic units differs slightly. For example, for Chinese, a Chinese character is taken as a basic unit. Each Chinese character comprises two phonemes (which can be considered as initial consonant part and vowel part) in the consonant-vowel phonetic symbol system. Therefore, the similarity between Chinese characters can be represented by the sum of consonant similarity and vowel similarity. However, more generally, for other languages, the number of phonemes contained in different words may often differ. For example, an English word is taken as a basic unit in English. The number of phonemes contained in different words is different. In this case, it is possible to find the best phoneme match mode between two words by DTW algorithm, and then calculate the pronunciation similarity between the words. For different languages, the other operations of the method of the present invention are the same.

Figure 4:
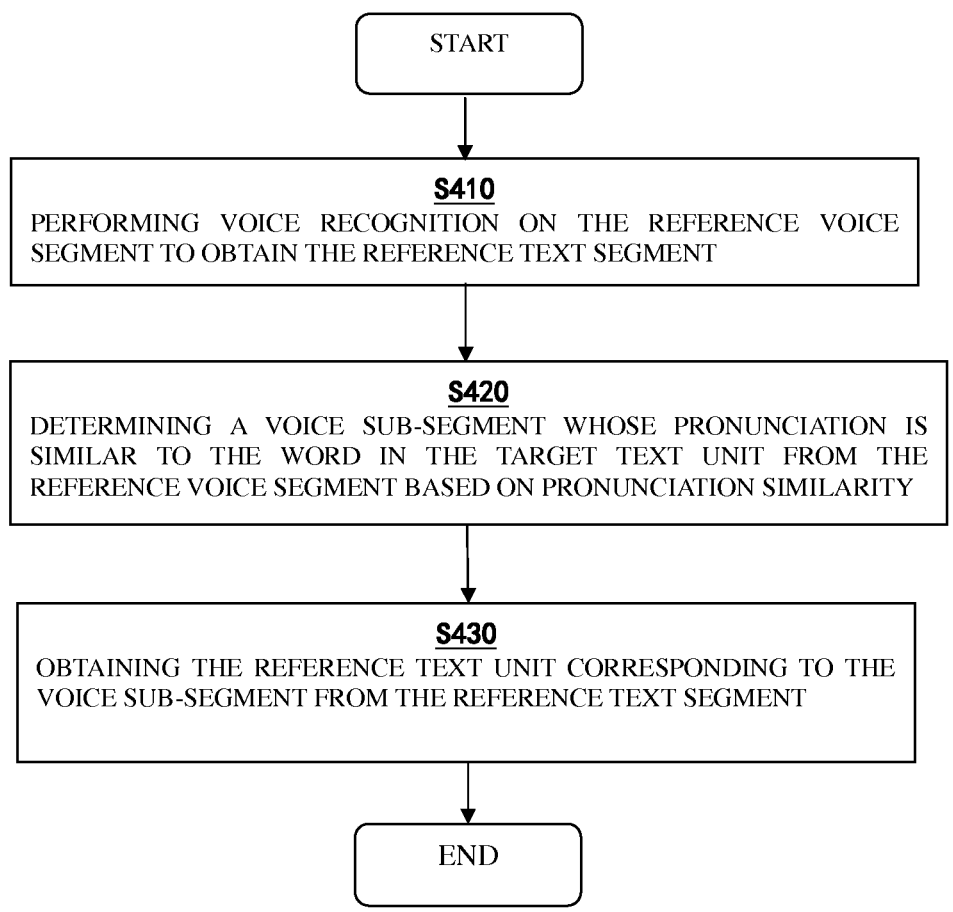
FIGS. 4 illustrates a flowchart of the method for correcting text according to another embodiment of the present invention.

Another implementation of block S230 in FIG. 2 is described in detail with reference to FIG. 4, in the following. As is the same as in block S310, in block S410, the voice recognition is performed on a reference voice segment to obtain a reference text segment.

At block S420, a voice sub-segment in the reference voice segment whose pronunciation is similar to words in the target text unit is determined based on pronunciation similarity. It is possible to determine the correspondence between the words in the target text unit and at least one voice sub-segment in the reference voice segment by comparing the reference voice segment input by a user with the pronunciation of the words in the target text unit.

At block S430, the reference text unit corresponding to the voice sub-segment is obtained from the reference text segment. Since the reference text segment after the voice recognition comprises the reference text unit corresponding to the voice sub-segment, in this case, it is possible to obtain the reference text unit for correcting the words in the target text unit based on the correspondence between the words in the target text unit and the voice sub-segment and the correspondence between the reference text unit and the voice sub-segment.

It is understood that, for the same target text unit to be corrected, the user may also input different reference voice segments by several times in order to improve the precision of correction. Each reference voice segment is compared with the target text unit to obtain a corresponding reference text unit. And the final reference text unit for correcting the target text unit is determined based on the obtained multiple reference text units.

The present invention is not limited to correcting text recognized from voice data. As long as the error in a text is caused by words with similar or same pronunciation, the present invention applies to it. For example, in the Pinyin input method of Chinese characters, errors in the text input often occur due to the Pinyin similar or the same. In this case, it is possible to correct the text by the method of the present invention. In addition, the correction method of the present invention may also be combined with other text correction methods to further improve the precision and efficiency.

Figure 5:
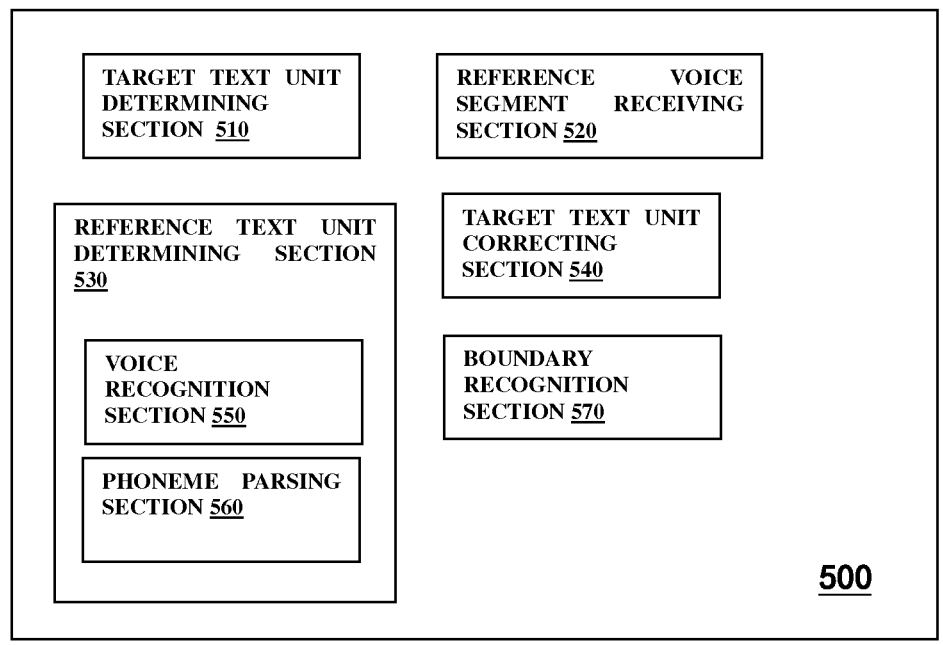
FIG. 5 illustrates a block diagram of the system for correcting text according to one embodiment of the present invention.

FIG. 5 schematically illustrates a block diagram of a system 500 for correcting text according to one embodiment of the present invention. The system 500 is used to perform the method of correcting text as described in the above. The system 500 comprises a target text unit determining section 510, as reference voice segment receiving section 520, reference text unit determining section 530, and a target text unit correcting section 540.

According to one embodiment of the present invention, the target text unit determining section 510 is configured to determine a target text unit to be corrected in a text. The reference voice segment receiving section 520 is configured to receive a reference voice segment input by a user for the target text unit. The reference text unit determining section 530 is configured to determine a reference text unit whose pronunciation is similar to a word in the target text unit based on the reference voice segment. The target text unit correcting section 540 is configured to correct the word in the target text unit in the text by using the reference text unit.

According to one embodiment of the present invention, the text is a recognized text of voice data.

According to one embodiment of the present invention, the reference text unit determining section 530 comprises a voice recognition section 550 configured to perform voice recognition on the reference voice segment to obtain the reference text segment; and the reference text unit determining section 530 is further configured to determine the reference text unit whose pronunciation is similar to the word in the target text unit from the reference text segment.

According to one embodiment of the present invention, the reference text unit determining section 530 further comprises a phoneme parsing section 560 configured to parse a phoneme corresponding to the reference text segment and a phoneme corresponding to the target text unit, wherein the reference text unit determining section 530 is further configured to determine the reference text unit whose pronunciation is similar to the word in the target text unit from the reference text segment based on phoneme similarity.

According to one embodiment of the present invention, the reference text unit determining section 530 further comprises a voice recognition section 550 configured to perform voice recognition on the reference voice segment to obtain the reference text segment, wherein the reference text unit determining section 530 is further configured to determine a voice sub-segment whose pronunciation is similar to the word in the target text unit from the reference voice segment, and obtain the reference text unit corresponding to the voice sub-segment from the reference text segment.

According to one embodiment of the present invention, the determined reference text unit is multiple reference text units, wherein the reference text unit determining section 530 is further configured to receive a selection by the user for one of the multiple reference text units to correct at least one word in the target text unit.

According to one embodiment of the present invention, the determined reference text unit is multiple reference text units, wherein the target text unit correcting section 540 is further configured to select the reference text unit for correcting the word in the target text unit based on the confidence of the multiple reference text units.

According to one embodiment of the present invention, the system 500 further comprises a boundary recognition section 570 configured to recognize unit boundaries of text units of the text.

According to one embodiment of the present invention, the target text unit determining section 510 is further configured to receive a selection by the user for text units in the text to determine the target text unit to be corrected.

According to one embodiment of the present invention, the target text unit determining section 510 is further configured to obtain the confidence of text units in the recognized text of the voice data, and determine the target text unit to be corrected based on the confidence.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for correcting text, comprising:
a processor in communication with one or more types of memory, a display and external devices, embodied in a computing device, the processor configured to:
determine a target text unit to be corrected in the text by selecting the target text unit from a plurality of recognized text units, wherein the target text unit is selected based on a lowest confidence value corresponding to the target text unit;
display the target text unit to a user on the display of the computing device and indicate the target text unit to be corrected on the display;
receive, via a graphical user interface of the computing device, a reference voice segment of the user, wherein the reference voice segment comprises a sentence of phrase;
performing automatic voice recognition on the reference voice segment to obtain a reference text segment, wherein the reference text segment comprises a plurality of reference text units;
determine that one of a plurality of reference text units has a pronunciation similar to a word in the target text unit, wherein the reference voice segment is in Chinese and the text is in Chinese characters that are divided into a first phoneme and a second phoneme and the pronunciation similarity between two Chinese characters is measured according to an average similarity per phoneme, wherein the average similarity per phoneme is obtained from a sum of the phoneme similarities of the two Chinese characters, that are being compared, divided by two; and
correct the word in the target unit in the text using the reference text unit with the similar pronunciation.

2. The system according to claim 1, wherein the processer is further configured to:
obtain the text by automatic voice recognition of voice data.

3. The system according to claim 1, wherein the processor if further configured to:
parse the reference text segment and the target text unit
determine that the one of the reference text units has the pronunciation similar to the word in the target text unit based on similarity of the phonemes.

4. The system according to claim 1, wherein, to determine that the one of the plurality of reference text units has the pronunciation similar to the word in the target text unit, the processor is further configured to, after the performing of voice recognition on the reference segment to obtain the reference text segment:
determine a voice sub-segment whose pronunciation is similar to the word in the target text unit from reference voice segment based on pronunciation similarity; and
obtain the reference text unit corresponding to the voice sub-segment from the reference text segment.

5. The system according to claim 1, wherein the determined reference text unit is multiple reference text units, wherein correcting the word in the target text unit in the text by the reference text unit further comprises:
receiving a selection by the user, using a mouse or selecting directly on a touch screen, for one of the multiple reference text units to correct at least one word in the target text unit.

6. The system according to claim 1,
wherein the determined reference text unit comprises multiple reference text units, and
wherein the target text unit determining section module selects the reference text unit for correcting the word in the target text unit based on the confidences of the multiple reference text units.

7. The system according to claim 1, wherein a boundary recognition section module recognizes unit boundaries of text units in the text.

8. The system according to claim 1, wherein the target text unit determining section module receives a selection by the user for text units in the text to determine the target text unit to be corrected.

9. The system according to claim 2, wherein the target text unit determining section module obtains the confidences of text units in the recognized text of the voice data, and determine the target text unit to be corrected based on the confidences.

* * * * *